United States Patent [19]
Nguyen

[11] Patent Number: 5,396,626
[45] Date of Patent: Mar. 7, 1995

[54] OBJECT-ORIENTED LOCATOR SYSTEM

[75] Inventor: Frank T. Nguyen, Campbell, Calif.

[73] Assignee: Taligent, Inc., Cupertino, Calif.

[21] Appl. No.: 102,078

[22] Filed: Aug. 4, 1993

[51] Int. Cl.6 .............................................. G06F 9/44
[52] U.S. Cl. .................... 395/700; 364/DIG. 1; 364/280; 364/281.3; 364/284; 364/284.3; 364/284.4; 395/650
[58] Field of Search ............................. 395/650, 700; 364/DIG. 1, DIG. 2, 280, 281.3, 284.3, 284, 284.4

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 4,989,132 | 1/1991 | Mellender et al. | 364/DIG. 1 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,212,792 | 2/1993 | Gerety et al. | 395/650 |
| 5,278,946 | 3/1994 | Shimada et al. | 395/62 |

FOREIGN PATENT DOCUMENTS 0520922 12/1992 European Pat. Off. .

OTHER PUBLICATIONS

Van Nostrand Reinhold, 1992, New York, US, pp. 54, 84, 62, 74, Levinson et al. "Now That I have OS/2 2.0 On My Computer-What Do I Do Next?"

IBM Technical Disclosure Bulletin, v.34(11), Apr. 1992, New York, US, p. 36 "OS/2 Presentation Manager: API For Setting System Value Change Notifications".

Primary Examiner—Thomas M. Heckler
Assistant Examiner—Jonathan Hall Backenstose
Attorney, Agent, or Firm—Keith Stephens

[57] ABSTRACT

A method and system for adding components (documents, tools, fonts, libraries, etc.) to a computer system without running an installation program. A location framework is employed to locate components whose properties match those specified in a search criteria. The framework receives notification from the system when components whose properties match the search criteria are added to or removed from the system.

24 Claims, 11 Drawing Sheets

OBJECT-ORIENTED LOCATOR SYSTEM

CROSS-REFERENCE TO RELATED PATENT APPLICATIONS

This patent application is related to the patent application entitled Object-Oriented System Locator System, by Frank Nguyen, filed Aug. 4, 1993, and assigned to Taligent, the disclosure of which is hereby incorporated by reference.

This patent application is related to the patent application entitled Container Object System, by Frank Nguyen, filed Jun. 3, 1993, and assigned to Taligent, the disclosure of which is hereby incorporated by reference.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field of the Invention

This invention generally relates to improvements in computer systems and more particularly to a system and method for automatically managing components in an object-oriented system.

Background of the Invention

Increasingly, system developers are required to make systems and applications easier to use and more intuitive. Many advances have recently occurred in ergonomics, but none have addressed the issue of managing and updating components employed by an application or system program on the fly. A component refers to a document, font, tool, shared library, or other system resource. An example of analogous art is the IBM PS/2 computer. Certain cards that are properly designed to comply with the MicroChannel architecture can be plugged in to a PS/2 system and used without reconfiguring the system. However, the card may still require configuration and any application program requiring resources present on the card must be properly designed, coded, compiled, link-edited and debugged before making use of the resources.

Ideally, system programs and applications should be able to identify components dynamically. The system should also be able to inform any system programs or applications of resource updates as changes in a system occur. No approach to addressing these problems has, to date, been proposed.

Summary of the Invention

Accordingly, it is a primary objective of the present invention to add components (documents, tools, fonts, libraries, etc.) to a computer system without running an installation program. A location framework is employed to locate components whose properties match those specified in a search criteria. The framework also receives notification from the system when components whose properties match the search criteria are added to or removed from the system.

The method and system include capability for interactively determining the type of locator request, obtaining a search criteria and scope of search, querying the system to identify resources that match the specified search criteria. The matches are returned to the initiating requester to enable access to the component.

DETAILED DESCRIPTION OF THE INVENTION

Figure 1:
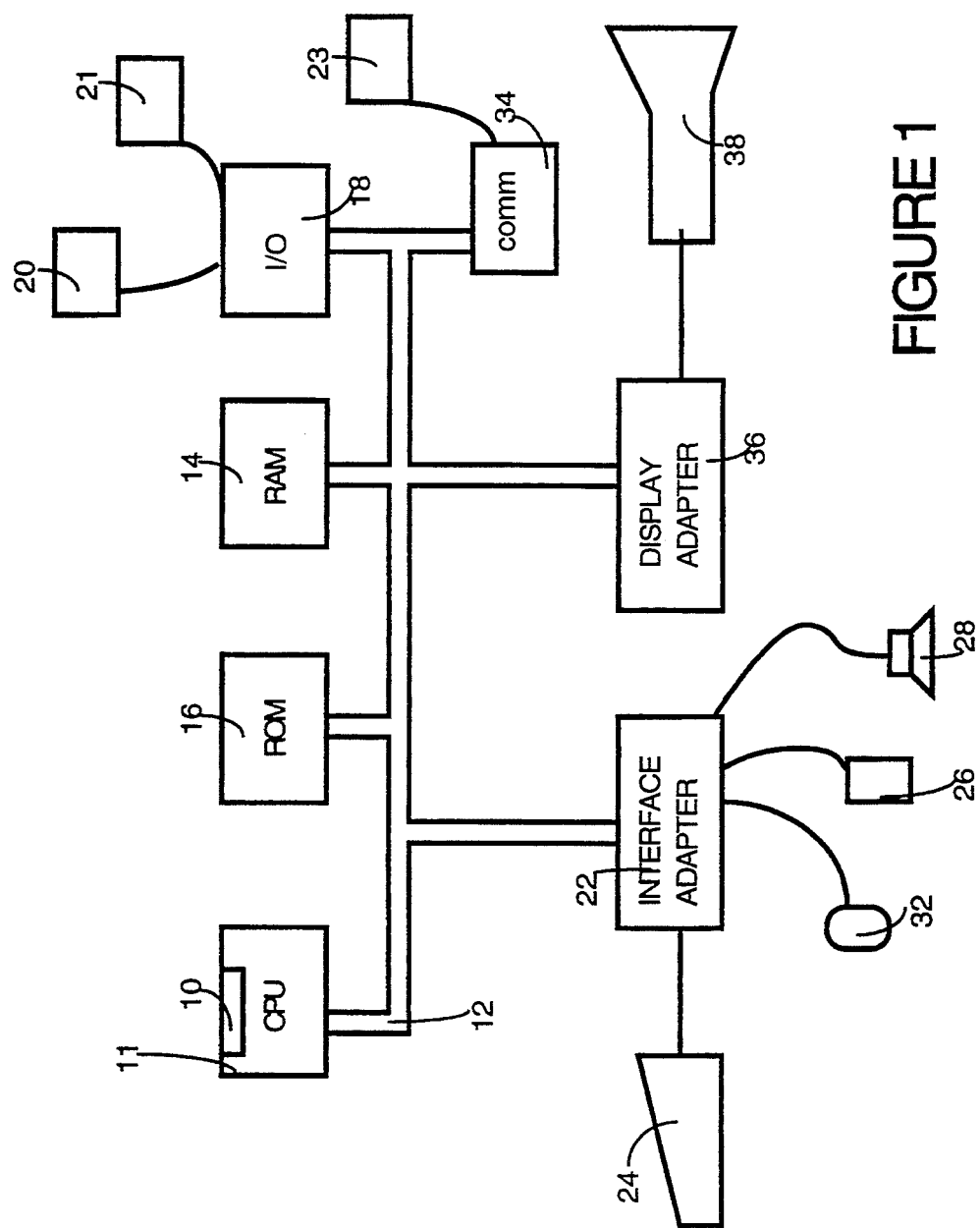
FIG. 1 is a block diagram of a personal computer system in accordance with a preferred embodiment.

The invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The computer has resident thereon an operating system such as the Apple System/7 ® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs,* University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on the level of the system and the nature of the problem. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls-the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, system integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment is essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented framework. In the framework, an item to be added/removed from a system is called a component. A component can be a document, a font, a tool, a shared library, etc.

A component can have properties associated with it. Every component has some set of properties which identify it. A component may have dependencies. The set of dependencies may vary from system to system for the same component. Determining and resolving these dependencies involves second-guessing a user's intention and a target system's configuration. For example, the system would have to determine which system a user will install this component in and what existing components the system has. The system is designed to enable a user to add components without running an installation program. To support this goal, an installation program is replaced with a location framework that provides the following capabilities:

System software can locate components whose properties match those specified to the location framework (e.g., all components of type tool).

System software can register interest in and receive notification on the addition/removal of components whose properties match those specified to the location framework.

The location framework has no user interface. Clients of the location framework, e.g., the place framework will provide a user interface to take advantage of the location framework capabilities.

Architecture

The location framework is designed to be extensible. It contains logic for locating components in a system, and determining how to notify a system when a component is added or removed. A key abstraction in the location framework is the locator class. Its semantics are defined by the abstract base class TComponentLocator. Concrete subclasses may use different searching mechanisms (the how of the location framework—file system properties, hardware capabilities, etc.) and may return different collections of objects (the what of the location framework—file system entities, hardware objects, etc.). A concrete subclass using TPropertyQuery and returning a collection of TFSEntity objects is TFileLocator. Clients of the location framework can register interest in and receive notification on the addition/removal of components whose properties match those specified to a locator. Clients can use the following abstractions from the notification framework: TNotifierConnection, TInterest, and TNotification. TNotifierConnection provides the connection between a client and a locator. The interest is specified in a subclass of TInterest. The notification is received in a subclass of TNotification. Every component has some set of properties which identify it. System software may attach properties to components to group specific components into specific folders. By matching the properties of a component with those of a folder, system software can determine where to put components. In a future release, users may also attach user-defined properties to components.

FlowCharts In Accordance With a Preferred Embodiment

Figure 2:
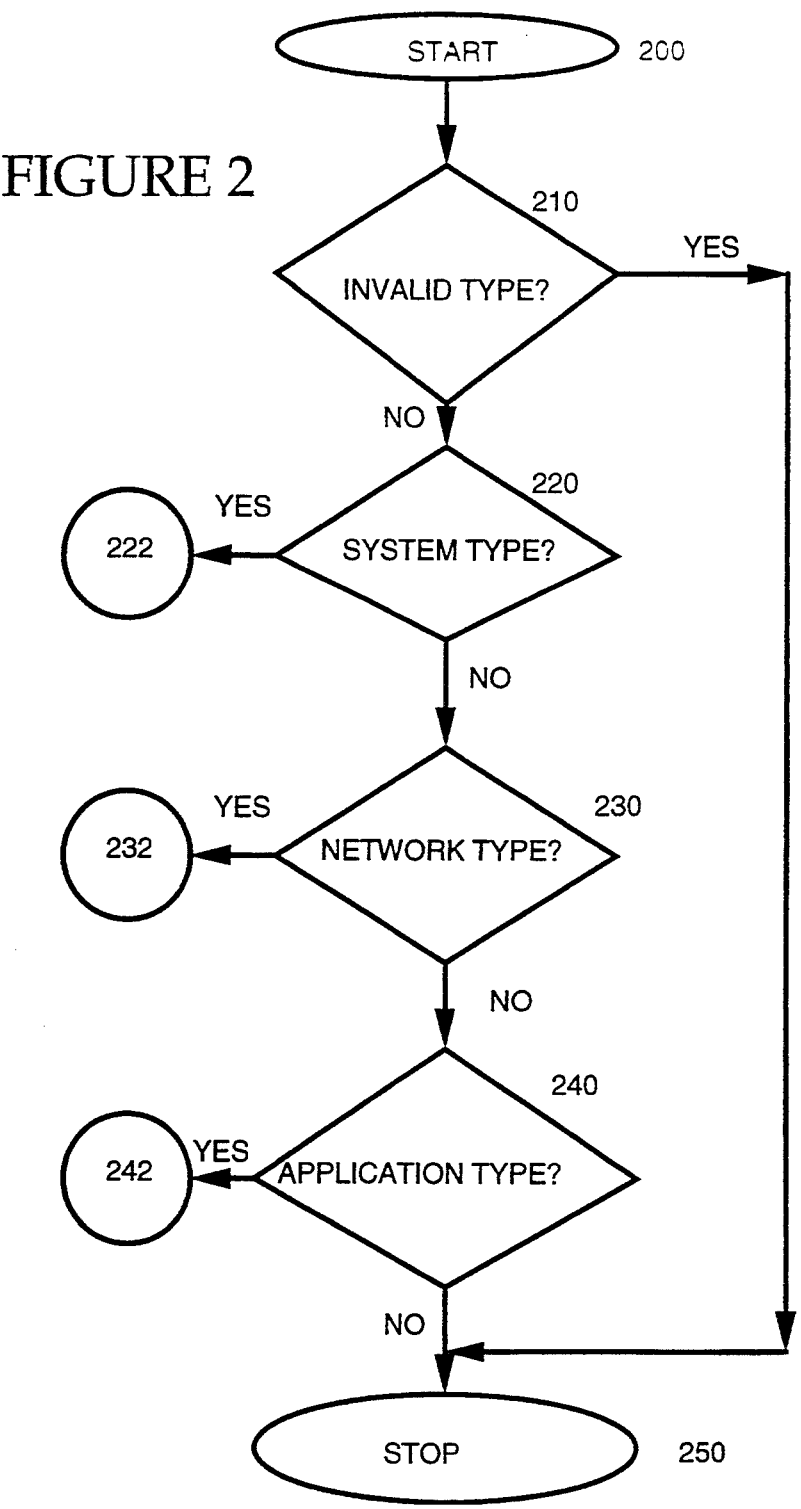
FIG. 2 is a flowchart of the logic associated with checking types of locator requests in accordance with a preferred embodiment.

FIG. 2 is a flowchart of the logic associated with checking types of locator requests in accordance with a preferred embodiment. Processing commences at terminal 200 which immediately passes control to decision block 210 to determine if an invalid type has been encountered. If so, then an appropriate error message is presented and processing is terminated at terminal 250. If not, then at decision block 220, a test is performed to determine if the locator request is for a system entity. If so, then control is passed via terminal 222 to FIG. 3 to determine the specific system entity involved. If not, then another test is performed at decision block 230 to determine if the locator request is for a network entity. If so, then control is passed via terminal 232 to FIG. 4 to determine the specific network entity involved. If not, then another test is performed at decision block 240 to determine if the locator request is for an application entity. If so, then control is passed via terminal 232 to FIG. 5 to determine the specific application entity involved. If not, then an error condition is noted and control is returned via terminal 250.

Figure 3:
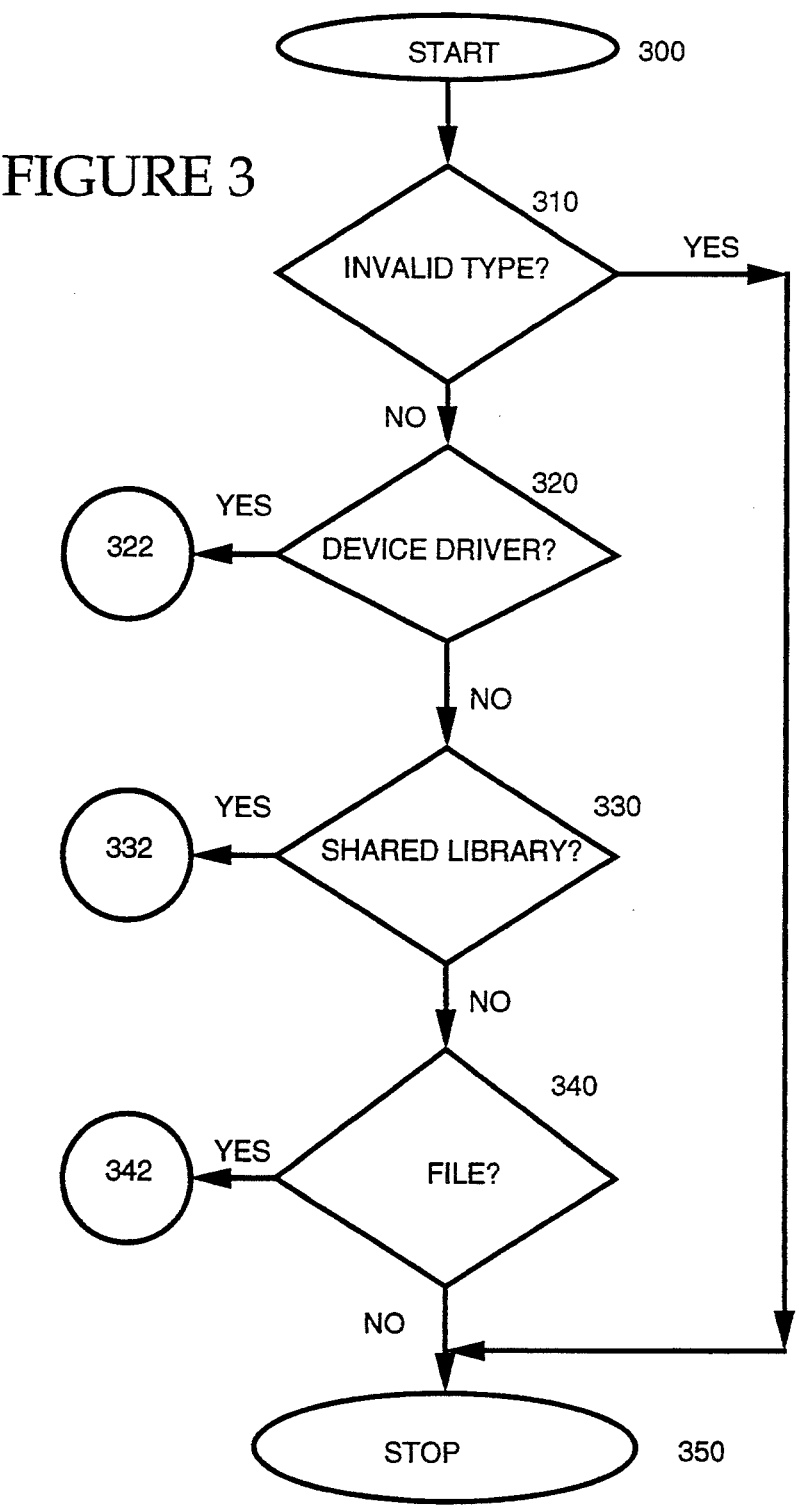
FIG. 3 is a flowchart of the logic associated with determining a specific type of system locator request in accordance with a preferred embodiment.

FIG. 3 is a flowchart of the logic associated with determining the specific system entity that the locator request is associated with. Processing commences at terminal 300 and immediately passes to decision block 310 to determine if an invalid type has been specified. If so, then an appropriate error message is presented and control returned via terminal 350. If not, then a test is performed at decision block 320 to determine if a device driver locator is the specific system locator involved. If so, then control passes via terminal 322 to FIG. 6 to process the device driver locator. If not, then a test is performed at decision block 330 to determine if a shared library locator is the specific system locator involved. If so, then control passes via terminal 322 to FIG. 6 to process the shared library locator. If not, then a test is performed at decision block 340 to determine if a file locator is the specific system locator involved. If so, then control passes via terminal 342 to FIG. 6 to process the file locator. If not, then an appropriate error message is presented and control returned via terminal 350.

Figure 4:
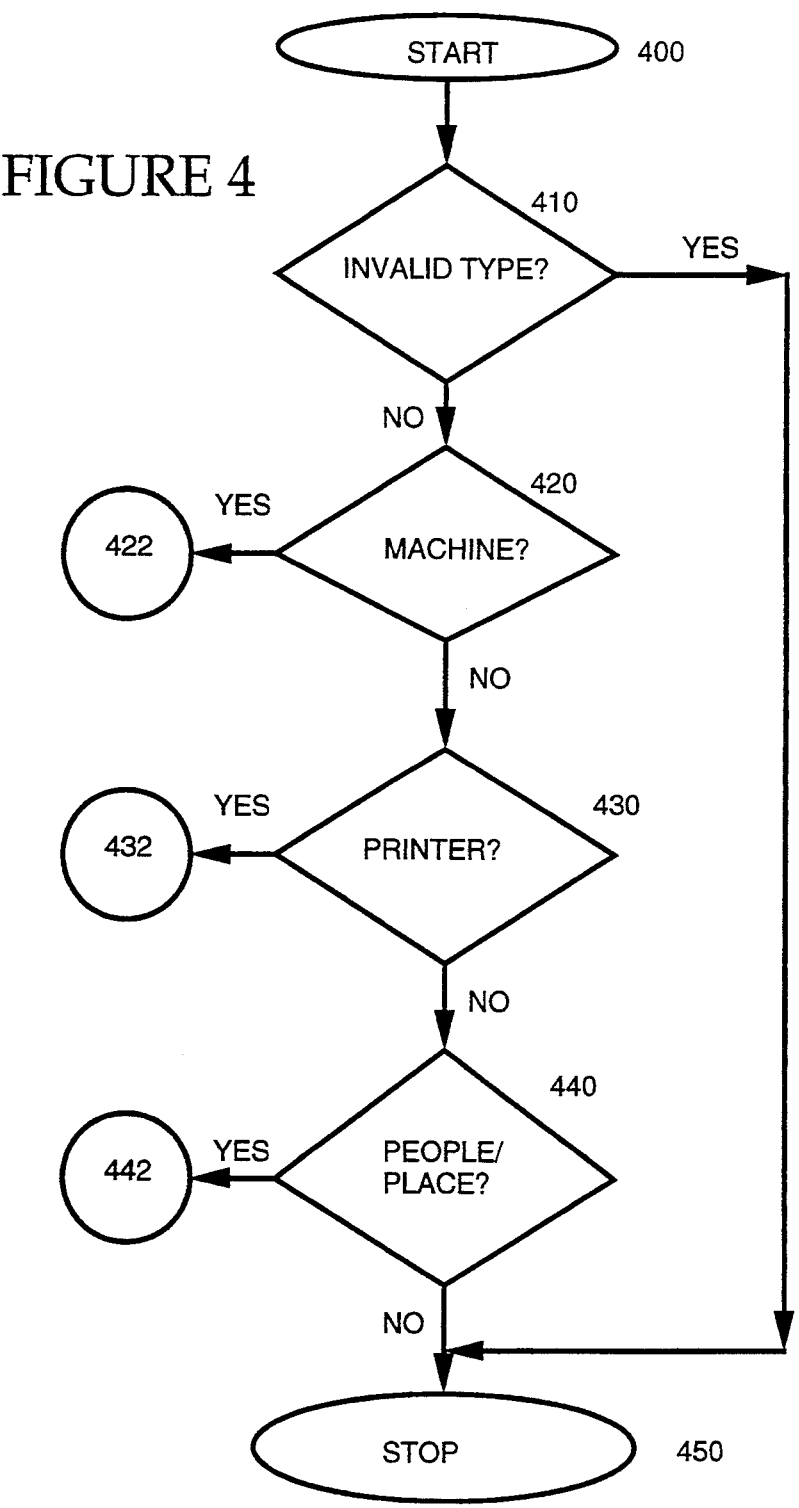
FIG. 4 is a flowchart of the logic associated with determining a specific type of network locator request in accordance with a preferred embodiment.

FIG. 4 is a flowchart of the logic associated with determining a specific type of network locator request in accordance with a preferred embodiment. Processing commences at terminal 400 and immediately passes to decision block 410 to determine if an invalid type has been specified. If so, then an appropriate error message is presented and control returned via terminal 450. If not, then a test is performed at decision block 420 to determine if a machine locator is the specific network locator involved. If so, then control passes via terminal 422 to FIG. 7 to process the machine locator. If not, then a test is performed at decision block 430 to determine if a printer locator is the specific network locator involved. If so, then control passes via terminal 422 to FIG. 7 to process the printer locator. If not, then a test is performed at decision block 430 to determine if a people/place locator is the specific network locator involved. If so, then control passes via terminal 432 to FIG. 7 to process the people/place locator. If not, then an appropriate error message is presented and control returned via terminal 450.

Figure 5:
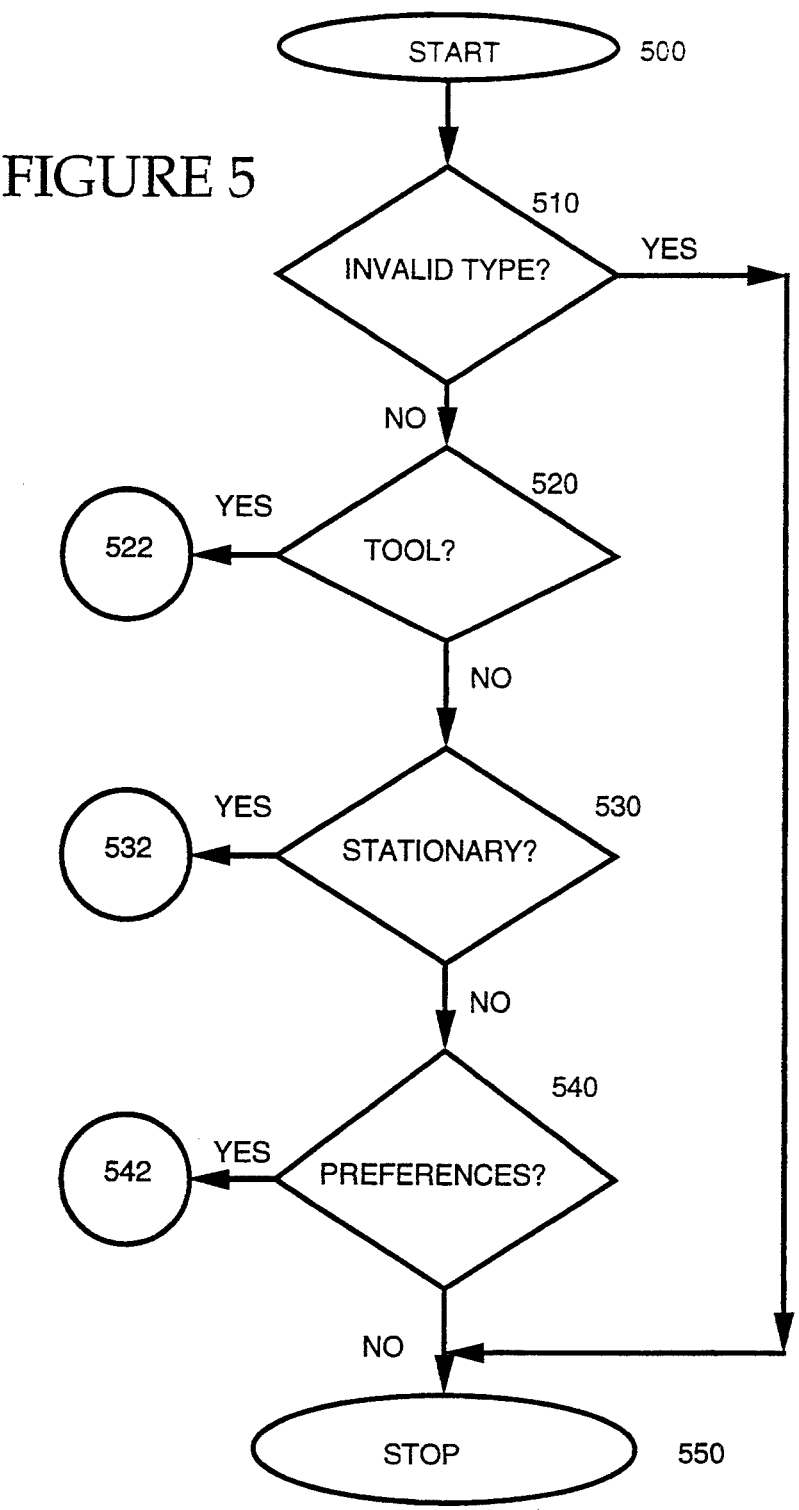
FIG. 5 is a flowchart of the logic associated with determining a specific type of application locator request in accordance with a preferred embodiment.

FIG. 5 is a flowchart of the logic associated with determining a specific type of application locator request in accordance with a preferred embodiment. Processing commences at terminal 500 and immediately passes to decision block 510 to determine if an invalid type has been specified. If so, then an appropriate error message is presented and control returned via terminal 550. If not, then a test is performed at decision block 520 to determine if a tool locator is the specific application locator involved. If so, then control passes via terminal 522 to FIG. 8 to process the tool locator. If not, then a test is performed at decision block 530 to determine if a stationary locator is the specific application locator involved. If so, then control passes via terminal 522 to FIG. 8 to process the stationary locator. If not, then a test is performed at decision block 530 to determine if a preferences locator is the specific application locator involved. If so, then control passes via terminal 532 to FIG. 8 to process the preferences locator. If not, then an appropriate error message is presented and control returned via terminal 550.

Figure 6:
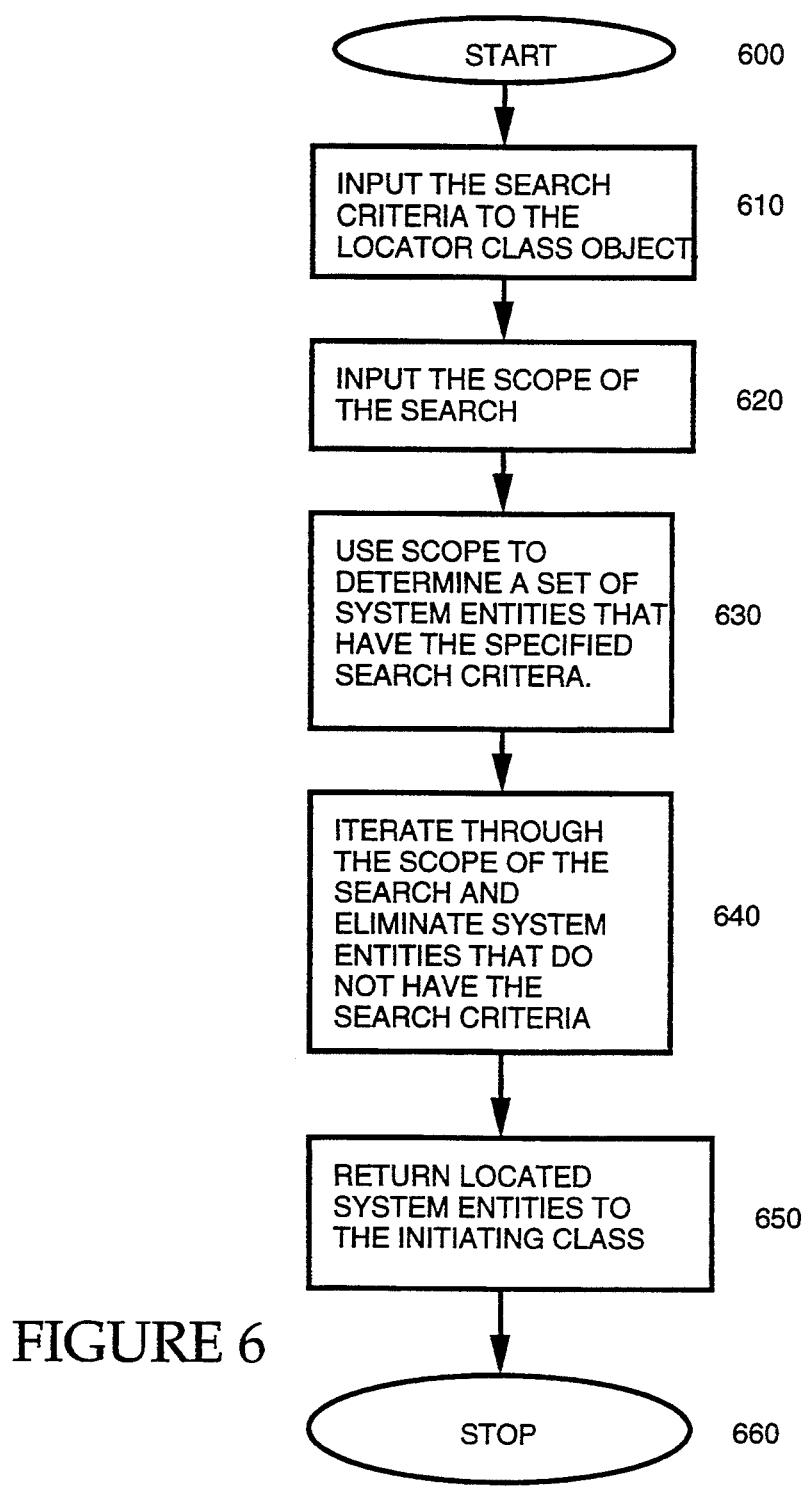
FIG. 6 is a flowchart of the logic associated with processing a system locator request in accordance with a preferred embodiment.

FIG. 6 is a flowchart of the logic associated with processing a system locator request in accordance with a preferred embodiment. Processing commences at terminal 600 and immediately passes to function block 610 to obtain the search criteria for the locator class object. Then, at function block 620, the scope of the search is input, and at function block 630 the scope is used to determine a set of system entities meeting the indicated search criteria. Next, at function block 640, the search is performed to locate appropriate system entities, which are returned via function block 650 to the initiating class, and processing is terminated at terminal 660.

Figure 7:
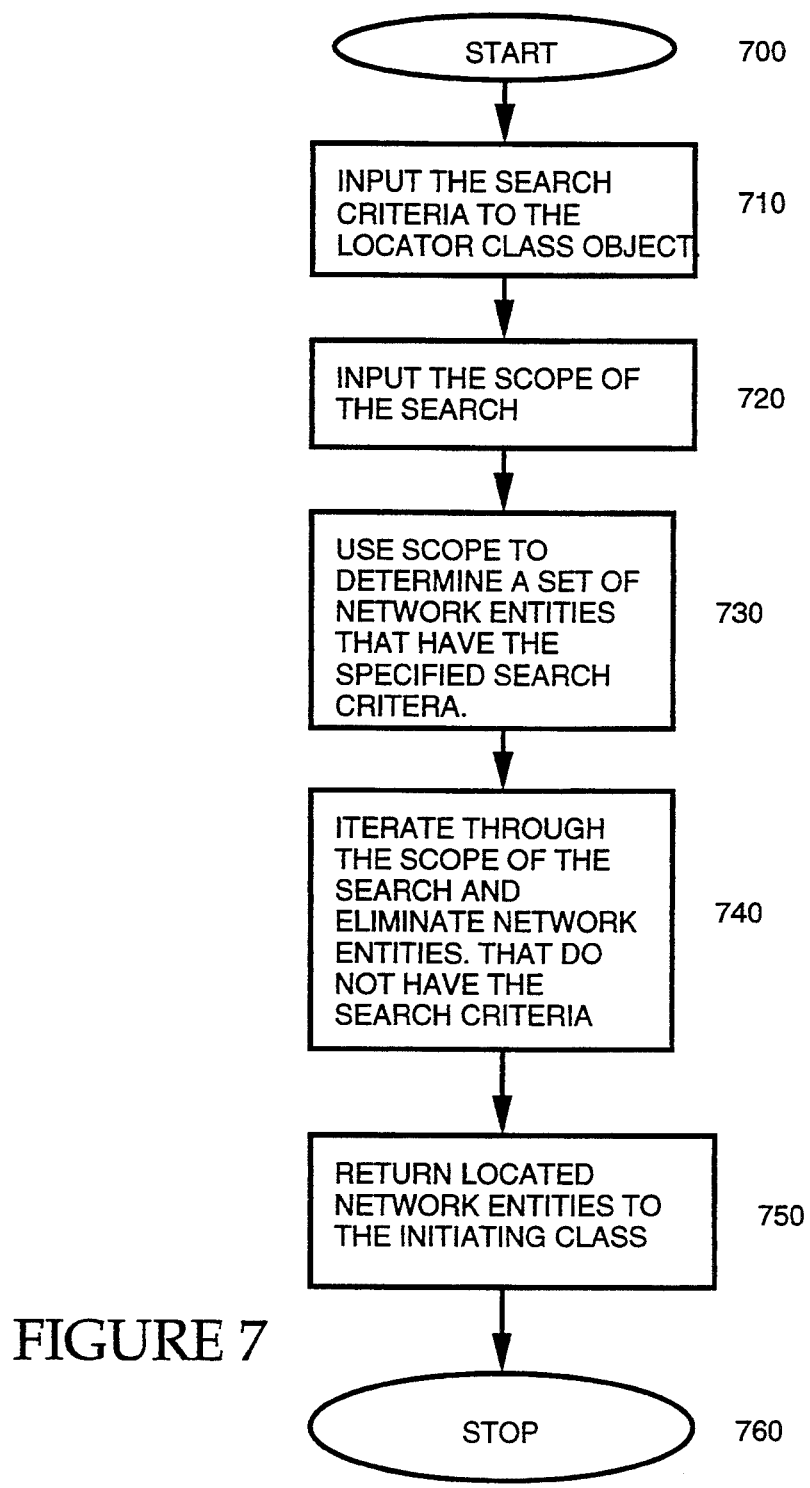
FIG. 7 is a flowchart of the logic associated with processing a network locator request in accordance with a preferred embodiment.

FIG. 7 is a flowchart of the logic associated with processing a network locator request in accordance with a preferred embodiment. Processing commences at terminal 700 and immediately passes to function block 710 to obtain the search criteria for the locator class object. Then, at function block 720, the scope of the search is input, and at function block 730 the scope is used to determine a set of network entities meeting the indicated search criteria. Next, at function block 640, the search is performed to locate appropriate network entities, which are returned via function block 650 to the initiating class, and processing is terminated at terminal 660.

Figure 8:
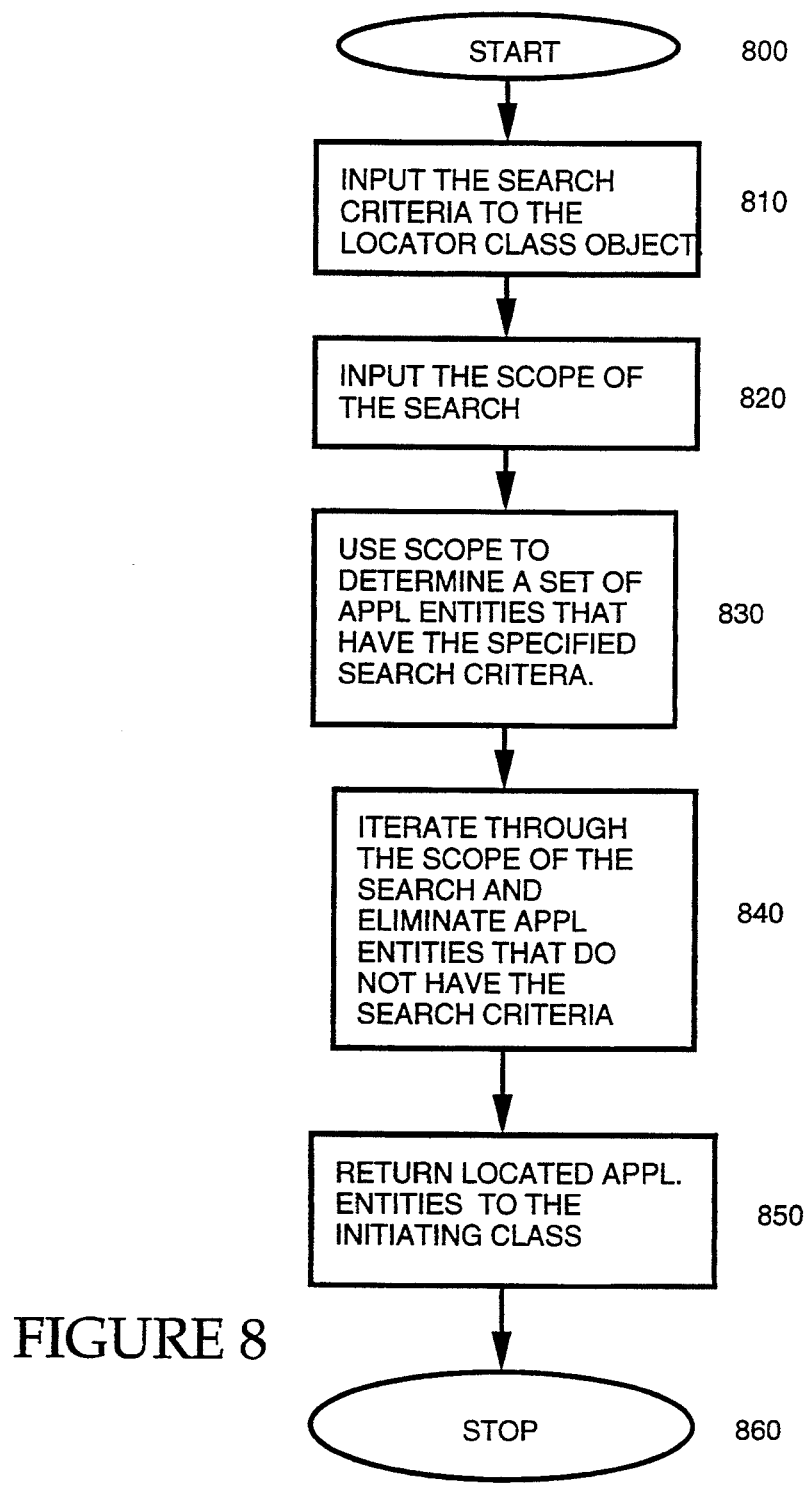
FIG. 8 is a flowchart of the logic associated with processing an application locator request in accordance with a preferred embodiment.

FIG. 8 is a flowchart of the logic associated with processing an application locator request in accordance with a preferred embodiment. Processing commences at terminal 800 and immediately passes to function block 810 to obtain the search criteria for the locator class object. Then, at function block 820, the scope of the search is input, and at function block 830 the scope is used to determine a set of application entities meeting the indicated search criteria. Next, at function block 840, the search is performed to locate appropriate application entities, which are returned via function block 850 to the initiating class, and processing is terminated at terminal 860.

Mechanisms

Different concrete subclasses of TComponentLocator may use different mechanisms for searching. The mechanism used by TFileLocator is TPropertyQuery. Other mechanisms could be used by the location framework. For example, if THardwareCapability is available as a mechanism, a new subclass could be developed: THardwareCapabilityLocator.

CLASS DESCRIPTIONS

TComponentLocator

Purpose

TComponentLocator is a templatized pure abstract base class that defines the protocol for locating components in a system. TComponentLocator subclasses must implement the protocol defined by TComponentLocator.

Instantiation

TComponentLocator is a pure abstract base class.

Deriving classes

Classes which require locating a specified item within a specified scope may derive from TComponentLocator. Each subclass can use a different searching mechanism.

Concurrency

TComponentLocator is a pure abstract base class. Subclasses are not required to be multi-thread safe since locators are not normally shared.

Resource use

TComponentLocator is a pure abstract base class. TComponentLocator subclasses must manage any resources used by their implementation.

Class interface

```
template <class AResult>
class TComponentLocator {
public:
    virtual Boolean     FindAll(TCollection<AResult>& theResult) = 0;
    virtual AResult     FindOne(const TText& theName) = 0;
    virtual TInterest*  CreateAddedInterest() = 0;
    virtual TInterest*  CreateRemovedInterest() = 0;
}
```

Method descriptions virtual Boolean FindAll(TCollection<AResult>& theresult)=0

This method is a pure virtual function to be used polymorphically. Its purpose is to find all the components within a scope and whose properties match those specified to the locator. The search scope can be a volume, a machine, or anything supported by a subclass. The search condition can be a property query, a hardware capability, or anything depending on the implementation provided by a subclass. The search result can be any kind of collection specified by a subclass. The search returns true if it finds some components.

virtual AResult FindOne(const TText& theName) =0

This method is a pure virtual function to be used polymorphically. Its purpose is to find the named component whose properties match those specified to the locator.

virtual TInterest* CreateAddedInterest()=0

This method is a pure virtual function to be used polymorphically. Its purpose is to create an interest a client can use to register with a locator for notification on the addition of components whose property values match that specified to the locator.

virtual TInterest* CreateRemovedInterest()=0

This method is a pure virtual function to be used polymorphically. Its purpose is to create an interest a client can use to register with a locator for notification on the removal of components whose properties match those specified to the locator.

TFileLocator

Purpose

TFileLocator is a concrete subclass of TComponentLocator which implements the protocol defined by TComponentLocator.

The search scope of TFileLocator is a file system entity, TFSEntity. The search condition is a property query, TPropertyQuery. The search result is a collection of file system entities or a single file system entity.

TFileLocator depends on the file system implementation of properties.

Instantiation

TFileLocator may be instantiated directly to provide a full implementation of the protocol defined by TComponentLocator.

Deriving classes

TFileLocator should be subclassed if a different implementation of properties is used.

Concurrency

Instances of TFileLocator should not be shared and are not required to be multi-thread safe.

Resource use

TFileLocator manages storage for all objects it creates.

Class interface

```
class TFileLocator: public MCollectible, public TComponentLocator<TFSEntity> {
public:
    // locator type
    static const TToken& kKind;
    // Change notifications.
    static const TToken&   kAddedFile;
    static const TToken&   kRemovedFile;
    // constructors and destructors.
    TFileLocator(const TFSEntity& theScope, const TPropertyQuery& theCondition);
    virtual ~TFileLocator();
    // TComponentLocator methods.
    virtual Boolean     FindAll(TCollection<TFSEntity>& theResult);
    virtual TFSEntity   FindOne(const TText& theName);
    virtual TInterest*  CreateAddedInterest();
    virtual TInterest*  CreateRemovedInterest();
    // new methods.
    TFSEntity           GetScope() const;
    TPropertyQuery      GetCondition() const;
}
```

Method descriptions virtual Boolean FindAll(TCollection<TFSEntity>& theresult)

This method is overridden to locate file system entities within volumes or directories. The search returns true if it finds a collection of one or more file system entities whose properties match the specified property query.

virtual TFSEntityFindOne(const TText& theName)

This method is overridden to locate the named file system entity whose properties match the specified property query.

virtual TInterest* CreateAddedInterest()

This method is overridden to create an interest a client can use to register with a file locator for notification on the addition of file system entities whose properties match the specified property query.

virtual TInterest* CreateRemovedInterest()

This method is overridden to create an interest a client can use to register with a file locator for notification on the removal of file system entities whose properties match the specified property query.

EXAMPLE

The following example illustrates how a developer could use the location framework. The example shows TFontFileLocator containing a TFileLocator. An alternative is to inherit TFontFileLocator from TFileLocator.

The declaration of the class TFontFileLocator is shown below. TFontFileLocator wants to locate files containing fonts.

collecting together. The smart folder then invokes the locator and requests particular documents containing the desired attributes to be collected in the folder. Additionally, the smart folder can instruct the locator to notify it when new documents containing the desired attributes are added to or removed from the system.

Figure 10:
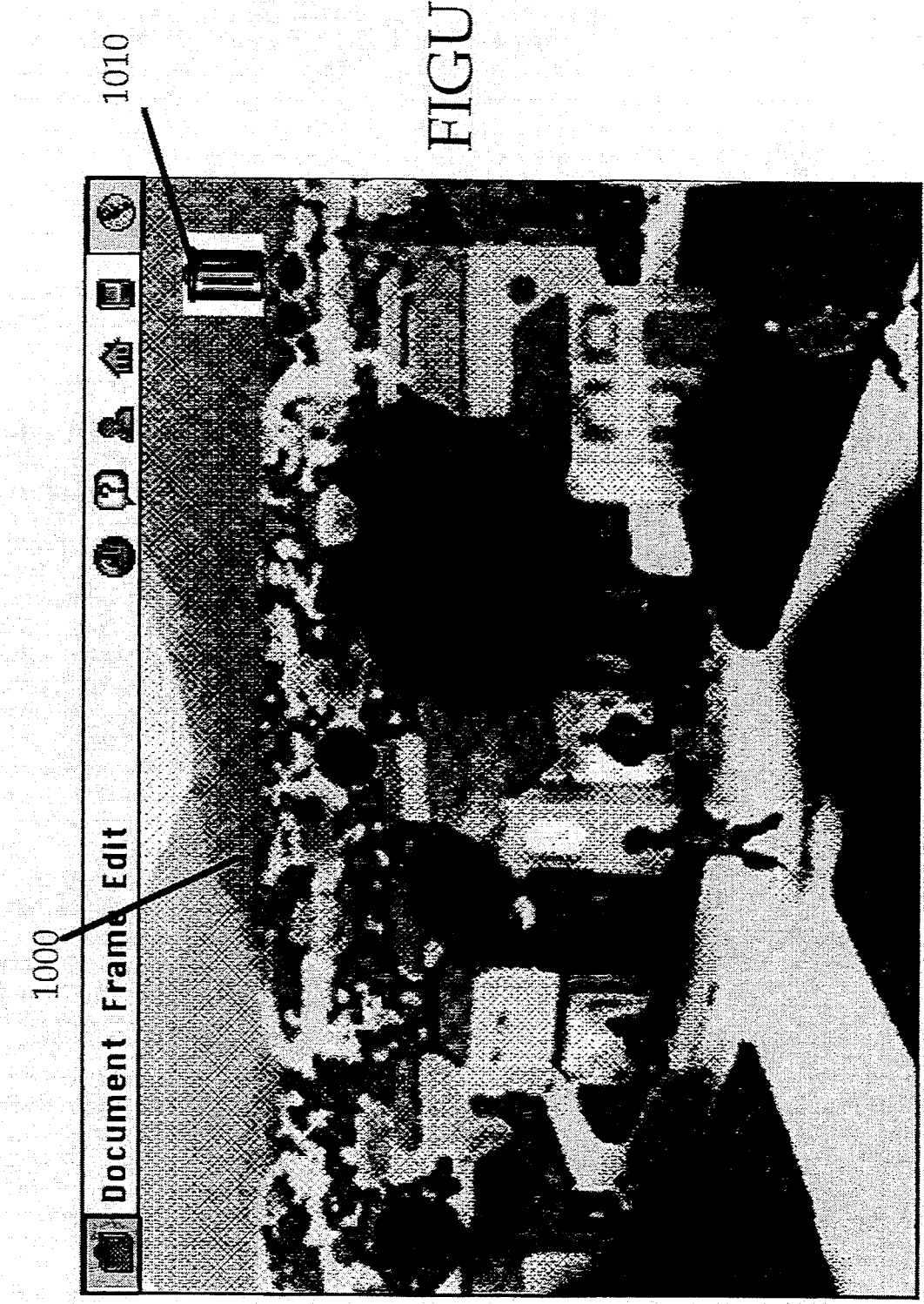
FIG. 10 is a simulation of a display of a place in accordance with a preferred embodiment.

FIG. 10 is a simulation of a display of a place in accordance with a preferred embodiment. A place 1000 uses a locator to find and display the associated trash can 1010 for use in the place. This is accomplished by the system attaching system-defined attributes to the trash. The place then invokes the locator and requests the particular trash containing the desired attributes to be used in the place. The locator returns the appropriate trash can which is displayed.

Figure 11:
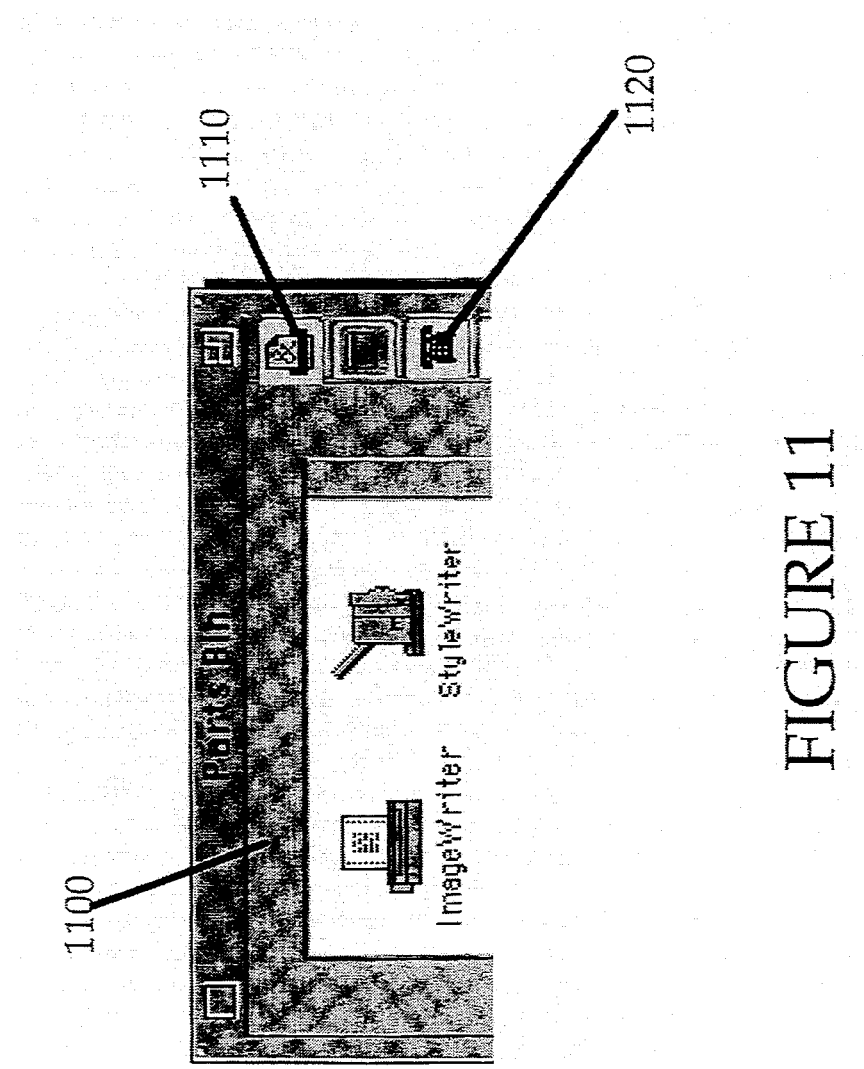
FIG. 11 is a simulation of a Parts Bin display in accordance with a preferred embodiment.

FIG. 11 is a simulation of a Parts Bin display in accordance with a preferred embodiment. The parts bin 1100 uses locators to find all of the "potentially" connectable devices. This is accomplished by the system attaching system-defined attributes to these devices. The parts bin then invokes the locators and requests the particular devices containing the desired attributes to be catalogued in the parts bin. The parts bin presentation consists of a window 1100 which has a tab for each device

```
class TFontFileLocator:   public TComponentLocator<TFSEntity> {
public:
        // constructors and destructors.
           TFontFileLocator(const TVolume& aScope);
           ~TFontFileLocator();
        // TComponentLocator methods.
        virtual Boolean        FindAll(TCollection<TFSEntity>& theResult);
        virtual TFSEntity      FindOne(const TText& theName);
        virtual TInterest*     CreateAddedInterest();
        virtual TInterest*     CreateRemovedInterest();
private:
        TFileLocator   fLocatorService;
}
TFontFileLocator constructor constructs a locator service with the specified scope.
TFontFileLocator::TFontFileLocator(const TVolume& aScope)
    : fLocatorService(TFileLocator(aScope, (TFont::kFontID).Exists()))
{
}
TFontFileLocator destructor does not need to do anything.
TFontFileLocator::~TFontFileLocator()
{
}
TFontFileLocator::FindAll uses the locator service to perform the search.
Boolean
TFontFileLocator::FindAll(TCollection<TFSEntity>& theResult)
{
    return (fLocatorService.FindAll(theResult));
}
TFontFileLocator::FindOne uses the locator service to find the named font file.
TFSEntity
TFontFileLocator::FindOne(const TText& theName)
{
    return (fLocatorService.FindOne(theName));
}
TFontFileLocator::CreateAddedInterest creates an interest a client can use to register with the
locator service for notification on the addition of font files.
TInterest*
TFontFileLocator::CreateAddedInterest()
{
    return (fLocatorService.CreateAddedInterest());
}
TFontFileLocator::CreateRemovedInterest creates an interest a client can use to register with
the locator service for notification on the removal of font files.
TInterest*
TFontFileLocator::CreateRemovedInterest()
{
    return (fLocatorService.CreateRemovedInterest());
}
```

Figure 9:
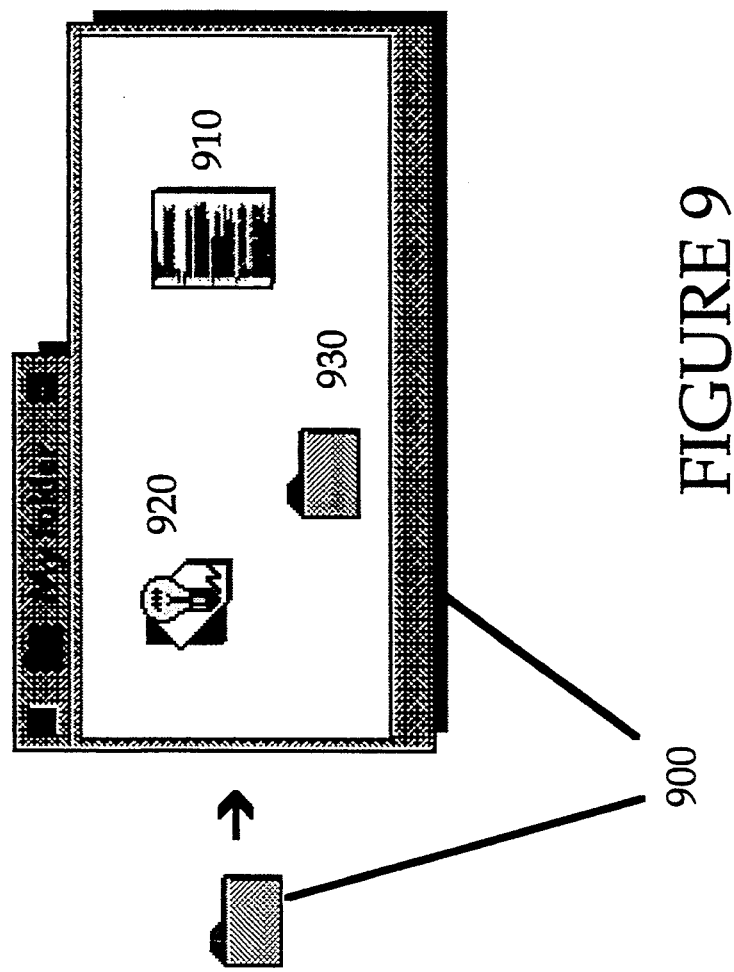
FIG. 9 is an illustration of a smart folder in accordance with a preferred embodiment.

FIG. 9 is an illustration of a smart folder 900, which uses a locator to organize documents 910, graphic objects 920, folders 930, etc., which a user is interested in type. For example, tabs will be provided for printers 1110 and modems 1120. A user can select a printer tab to see all the printers (found by a printer-device locator).

While the invention has been described in terms of a preferred embodiment in a specific system environment, those skilled in the art will recognize that the invention can be practiced, with modification, in other and different hardware and software environments within the spirit and scope of the appended claims.

Having thus described our invention, what I claim as new, and desire to secure by Letters Patent is:

1. A method in a computer system comprised of a plurality of system entities including a memory and an object-oriented operating system resident in said memory, said object-oriented operating system augmented to accept a client initiated search, each entity, in turn, being comprised of a plurality of hardware or software components and each hardware or software component having predetermined properties, said method determining whether at least one component having properties supplied by a client exists in said computer system at any time while said client is active and supplying the client with the identity of said at least one component, comprising the steps of:
  (a) receiving scope criteria from said client indicating a set of said plurality of system entities to be searched, said plurality of system entities comprising network entities, system entities, and application entities;
  (b) receiving search criteria from said client indicating hardware or software component properties required by said client, and
  (b1) receiving search criteria from said client indicating system component properties;
  (c) utilizing said scope criteria and said search criteria to query said object-oriented operating system augmented to accept a client initiated search to identify one or more hardware or software components that satisfy said scope criteria and said search criteria indicating hardware or software component properties, and
  (c1) using said scope criteria and said operating system to collect a set of system entities; and
  (c2) examining each of said set of system entities collected in step (c1) to determine if any components having system component properties that satisfy said search criteria exist in said each system entity; and
  (d) returning to said client identities of components identified in step (c) to enable said client to access one or more of said identified hardware or software components at any time while said client is active.

2. A method as recited in claim 1, wherein said components include network components, step (b) comprises the step of:
  (b2) receiving search criteria from said client indicating network component properties; and step (c) includes said step of:
  (c5) using said scope criteria and said operating system to collect a set of system entities; and
  (c6) examining each of said set of system entities collected in step (c5) to determine if any components having network component properties that satisfy said search criteria exist in said each system entity.

3. A method as recited in claim 1, wherein said components include application components, step (b) comprises the step of:
  (b3) receiving search criteria from said client indicating application component properties;
  and step (c) includes the step of:
  (c7) using said scope criteria and said operating system to collect a set of system entities; and
  (c8) examining each of said set of system entities collected in step (c7) to determine if any components having application component properties that satisfy said search criteria exist in said each system entity.

4. Apparatus operable in a computer system comprised of a plurality of system entities including a memory and an operating system resident in said memory, said operating system augmented to accept a client initiated search, each entity, in turn, being comprised of a plurality of hardware or software components and each hardware or software component having predetermined properties, said apparatus determining whether at least one hardware or software component having properties supplied by a client exists in said computer system at any time while said client is active, comprising:
  (a) means for receiving scope criteria from said client indicating a set of said plurality of system entities to be searched, said plurality of system entities comprising network entities, system entities, and application entities;
  (b) means for receiving search criteria from said client indicating hardware or software component properties required by said client, and
  (b1) means for receiving search criteria from said client indicating system component properties;
  (c) means responsive to said scope criteria and said search criteria for creating a locator object comprising a method for querying said object-oriented operating system augmented to accept a client initiated search to identify one or more hardware or software components that satisfy said search criteria;
  (c1) means for using said scope criteria and said operating system to collect a set of system entities; and
  (c2) means for examining each of said set of system entities collected by said means for using said scope criteria to determine if any components having system component properties that satisfy said search criteria exist in said each system entity; and
  (d) means responsive to a location request received from said client for invoking said locator object to execute said method and retrieve component identities from said operating system augmented to accept a client initiated search; and
  (e) means responsive to retrieved hardware or software component identities for returning to said client said retrieved identities to enable said client to access said one or more hardware or software components at any time while said client is active.

5. An apparatus as recited in claim 4 wherein said returning means comprises means for returning pointers to each component identified by said method to enable said client to access said one or more components.

6. An apparatus as recited in claim 4 further comprising:
  means for creating a folder object comprising a plurality of components specified by said client;
  means for receiving scope criteria from said client indicating a set of said plurality of system entities to be searched for each of said plurality of specified components in said folder object;

means for receiving search criteria from said client indicating component properties desired by said client for each of said plurality of specified components in said folder object; and means responsive to said scope criteria and said search criteria received from said client for said each of said plurality of specified components in said folder object for creating a locator object associated with said folder object which locator object comprises a method for querying said operating system to identify one or more existing components that satisfy said search criteria for said each specified component.

7. A method operable in a computer system comprised of a plurality of system entities including a memory and an object-oriented operating system resident in said memory, said object-oriented operating system augmented to accept a client initiated search, each entity, in turn, being comprised of a plurality of hardware or software components and each hardware or software component having predetermined properties, said method determining whether at least one hardware or software component having properties supplied by a client exists in said computer system at any time while said client is active, comprising the steps of:

(a) receiving scope criteria from said client indicating a set of said plurality of system hardware or software entities to be searched, said plurality of system entities comprising network entities, system entities, and application entities;

(b) receiving search criteria from said client indicating hardware or software component properties required by said client, and (b1) means for receiving search criteria from said client indicating system component properties;

(c) utilizing said scope criteria and said search criteria to create a locator object comprising a method for querying said object-oriented operating system augmented to accept a client initiated search to identify one or more hardware or software components that satisfy said scope criteria and said search criteria, and (c1) means for using said scope criteria and said operating system to collect a set of system entities; and (c2) means for examining each of said set of system entities collected by said means for using said scope criteria to determine if any components having system component properties that satisfy said search criteria exist in said each system entity; and (d) invoking said locator object to execute said method and (e) returning to said client said identities of hardware or software components identified by said method to enable said client to access said one or more hardware or software components at any time while said client is active.

8. A method as recited in claim 7 wherein step (e) comprises the step of:

(e1) returning pointers to each component identified by said method to enable said client to access said one or more components.

9. A method as recited in claim 7 further comprising the steps of:

(f) receiving a notification request from said client and forwarding said request to said locator object; and (g) forwarding a notification to said client when one or more components have been identified by said method.

10. A method as recited in claim 9 wherein step (g) comprises the step of:

(g1) forwarding a notification to said client when one or more components identified by the method are removed from said computer system.

11. A method as recited in claim 9 wherein step (g) comprises the step of:

(g2) forwarding a notification to said client when one or more components identified by said method are added to said computer system.

12. A method as recited in claim 9 wherein said client is an application program and wherein step (g) comprises the steps of:

(g3) forwarding an update notification to said application program when one or more components identified by the method are updated, said update notification identifying said one or more updated components; and (g4) updating said application program in response to said notification.

13. A method as recited in claim 9 further comprising the steps of:

(h) creating a folder object comprising a plurality of components specified by said client:

(i) receiving scope criteria from said client indicating a set of said plurality of system entities to be searched for each of said plurality of specified components in said folder object:

(j) receiving search criteria from said client indicating component properties desired by said client for each of said plurality of specified components in said folder object; and (k) for each of said plurality of specified components in said folder object, using said scope criteria and said search criteria received from said client for said each specified component to create a locator object associated with said folder object which locator object comprises a method for querying said operating system to identify one or more existing components that satisfy said search criteria for said each specified component.

14. A method as recited in claim 13 further comprising the step of:

(l) forwarding a notification to said folder when at least one of said locator objects associated with said folder identifies a component that satisfies said search criteria of said at least one locator object; and (m) forwarding a notification to said client when said folder object receives a notification from any of said associated locator objects.

15. An apparatus operable in a computer system comprised of a plurality of system entities including a memory and an object-oriented operating system resident in said memory, said object-oriented operating system augmented to accept a client initiated search, each entity, in turn, being comprised of a plurality of hardware or software components and each hardware or software component having predetermined properties, said apparatus determining whether at least one component having properties supplied by a client exists in said computer system at any time while said client is active and comprising:

(a) means for receiving scope criteria from said client indicating a set of said system entities to be searched, said plurality of system entities comprising network entities, system entities, and application entities;

(b) means for receiving search criteria from said client indicating hardware or software component properties required by said client, and (b1) means for receiving search criteria from said client indicating system component properties;

(c) means responsive to said scope criteria and said search criteria for querying said object-oriented operating system augmented to accept a client initiated search to retrieve said identities of one or more hardware or software components that satisfy said scope criteria and said search criteria from said object-oriented operating system augmented to accept a client initiated search, and (c1) means for using said scope criteria and said operating system to collect a set of system entities; and (c2) means for examining each of said set of system entities collected by said means for using said scope criteria to determine if any components having system component properties that satisfy said search criteria exist in said each system entity; and (d) means responsive to retrieved identities of one or more hardware or software components that satisfy said search criteria for returning to said client said retrieved identities to enable said client to access one or more of said identified hardware and software components at any time while said client is active.

16. An apparatus as recited in claim 15, wherein said querying means comprises:

means responsive to said scope criteria and cooperating with said operating system for collecting a set of system entities; and means responsive to a collection of system entities for determining if any components having component properties that satisfy said search criteria exist in said each system entity.

17. An apparatus as recited in claim 15, wherein said components include system components and wherein said scope criteria receiving means comprises means for receiving search criteria from said client indicating system component properties and said querying means comprises:

means responsive to said scope criteria and cooperating with said operating system for collecting a set of system entities; and means responsive to a collected set of system entities for examining each of said collected set to determine if any components having system component properties that satisfy said search criteria exist in said each system entity.

18. An apparatus as recited in claim 15, wherein said components include network components and wherein said scope criteria receiving means comprises means for receiving search criteria from said client indicating network component properties and said querying means comprises:

means responsive to said scope criteria and cooperating with said operating system for collecting a set of system entities; and means responsive to a collected set of system entities for examining each of said collected set to determine if any components having network component properties that satisfy said search criteria exist in said each system entity.

19. An apparatus as recited in claim 15, wherein said components include application components and wherein said scope criteria receiving means comprises means for receiving search criteria from said client indicating application component properties and said querying means comprises:

means responsive to said scope criteria and cooperating with said operating system for collecting a set of system entities; and means responsive to a collected set of system entities for examining each of said collected set to determine if any components having application component properties that satisfy said search criteria exist in said each system entity.

20. An apparatus as recited in claim 4 further comprising:

means for receiving a notification request from said client and forwarding said request to said locator object; and means in said locator object and responsive to said retrieved identities for forwarding a notification to said client when one or more components have been identified by said method.

21. An apparatus as recited in claim 20 wherein said notification forwarding means comprises means responsive to said retrieved identities for forwarding a notification to said client when one or more components identified by said method are added to said computer system.

22. An apparatus as recited in claim 20 wherein said notification forwarding means comprises means responsive to said retrieved identities for forwarding a notification to said client when one or more components identified by said method are removed from said computer system.

23. An apparatus as recited in claim 20 wherein said client is an application program and wherein means for forwarding a notification to said client comprises:

means for forwarding an update notification to said application program when one or more components identified by said method are updated, said update notification identifying said one or more updated components; and means responsive to said notification for updating said application program.

24. An apparatus as recited in claim 23 further comprising:

means for creating a folder object comprising a plurality of components specified by said client;

means for receiving scope criteria from said client indicating a set of said plurality of system entities to be searched for each of said plurality of specified components in said folder object;

means for receiving search criteria from said client indicating component properties desired by said client for each of said plurality of specified components in said folder object; and means responsive to said scope criteria and said search criteria received from said client for said each of said plurality of. Specified components in said folder object for creating a locator object associated with said folder object which locator object comprises a method for querying said operating system to identify one or more existing components that satisfy said search criteria for said each specified component.

* * * * *